United States Patent [19]

Yokota

[11] Patent Number: 5,024,370
[45] Date of Patent: Jun. 18, 1991

[54] AUTOMATIC SOLDERING METHOD AND THE APPARATUS THEREOF

[75] Inventor: Senichi Yokota, Hachioji, Japan

[73] Assignee: Yokota Machinery Co., Ltd., Tokyo, Japan

[21] Appl. No.: 454,637

[22] Filed: Dec. 21, 1989

[30] Foreign Application Priority Data

Dec. 31, 1988 [JP] Japan .................................. 63-335180
May 31, 1989 [JP] Japan .................................. 1-139859

[51] Int. Cl.⁵ .............................................. H05K 3/34
[52] U.S. Cl. .................................. 228/180.1; 228/37; 228/260
[58] Field of Search ....................... 228/37, 180.1, 260

[56] References Cited

U.S. PATENT DOCUMENTS 4,424,931  1/1984  Lovrenich ........................ 228/180.1

FOREIGN PATENT DOCUMENTS

82967  4/1986  Japan ...................................... 228/37

Primary Examiner—Kenneth J. Ramsey
Attorney, Agent, or Firm—Finnegan, Henderson, Farabow, Garrett & Dunner

[57] ABSTRACT

An automatic soldering method and the apparatus thereof is disclosed, wherein a transporting device progressively moves up a horizontal position of a base board as the latter is transported to be soldered in a direction from a base board entrance side to a soldered base board exit side of a base board transporting path. An elongated molten solder storing tank is arranged laterally of the base board transporting path. The solder storing tank has an elongated molten solder jetting nozzle located therein and is inclined in a horizontal plane with respect to a base board transporting direction. An operating device is provided to adjust an inclination of the base board in a vertical plane intersecting the base board transporting direction such that a distance between a lower side of the base board and a top end of the molten solder jetting nozzle is constant all through the length of the nozzle as the base board is transported past over the nozzle.

7 Claims, 10 Drawing Sheets

AUTOMATIC SOLDERING METHOD AND THE APPARATUS THEREOF

BACKGROUND OF THE INVENTION

The invention relates to an automatic soldering method and the apparatus thereof and more particularly relates to a method for arranging an elongated molten solder storing tank laterally of a base board transporting direction in a manner as inclined with respect to the base board transporting direction in a horizontal plane while transporting a base board in a manner that a horizontal position of the base board is progressively moved up as the base board is transported and further in a manner that the base board is inclined in a vertical plane intersecting the base board transporting direction such that a distance between a lower side of the base board and a top of an elongated molten solder jetting nozzle provided in the solder storing tank is constant all through the length of the nozzle as the base board is transported part over the nozzle, to thereby secure a same soldering condition between the points of the base board to be soldered and the molten solder jetted up from the nozzle all through the length of the nozzle.

Another aspect of the invention relates to a method and the apparatus thereof for transporting a carrier carrying the base board to be soldered from a base board entrance side to a soldered base board exit side of a base board transporting path and then feeding back the carrier from the soldered base board exit side to the base board entrance side so that the carrier may carry a new base board to be soldered again.

Figure 12:
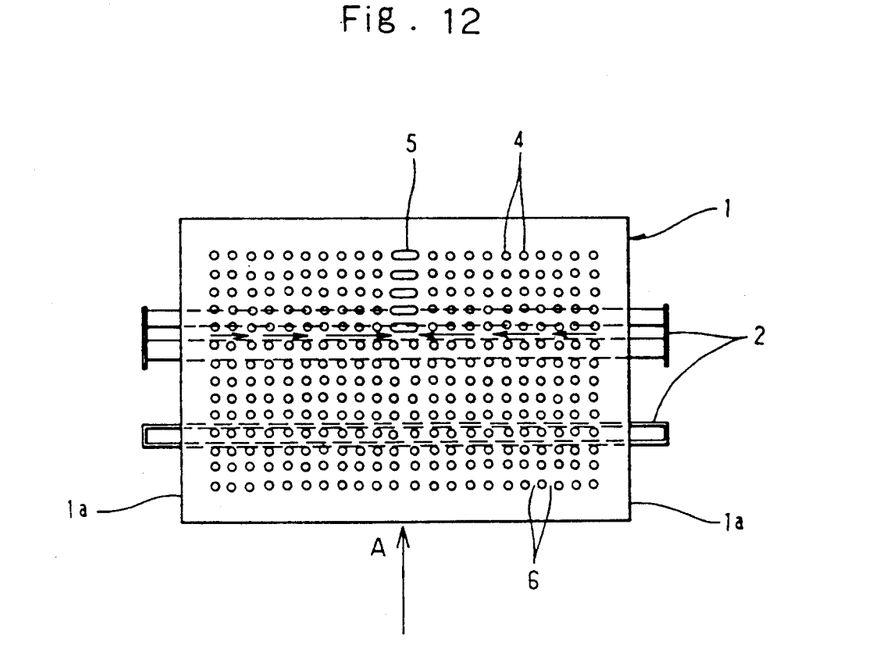
FIG. 12 is a plan view of a base board and nozzles showing the phenomena of solder bridges formed on the base board.
Figure 13:
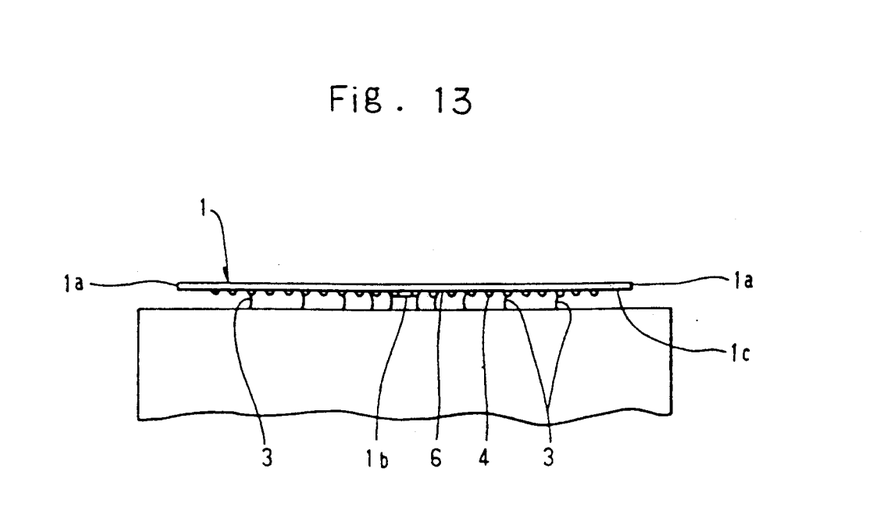
FIG. 13 is a side elevational view of the base board and the nozzles showing a flow of molten solder causing the solder bridges.

A conventional automatic soldering method and the apparatus is shown in FIGS. 12 and 13, wherein a base board 1 having electronic elements mounted thereon is soldered with the molten solder 3 jetted up from an elongated opened nozzle 2 by the action of a molten solder pressing device while the base board is transported over the nozzle arranged laterally of a base board transporting direction with the right angles.

According to the conventional method and apparatus, when a lower side 1c of the base board 1 is moved past the molten solder 3 jetting up from the nozzle 2, that is, when the soldering process is ended, the molten solder 3 will progressively flow from one end 1a toward a center 1b on the lower side 1c of the base board 1 while the molten solder is separating one after another at the soldering points of the base board. In this case, it is unavoidable that the flow of molten solder will result in the phenomena such as bridges, icicles, drops or dews formed at the center 1b of the width of the base board 1. Such defective soldering places 5 have to be confirmed by inspection and have to be amended by means of a soldering iron. Such inspection and amendment operations will increase the soldering processes and further decrease the operation efficiency. Moreover the failure of defection confirmation and the incomplete amendment will inevitably lower the quality of products.

More precisely, the base board 1 is transported while one end 1a is held, and is liable to be downwardly bent due to its own weight and the weight of the electronic parts mounted on the base board. Such downward bend will be further encouraged as the base board 1 is preheated by a heater and further heated by the molten solder at the time of soldering process. It is therefore apparent that the center part 1b of the base board 1 will be lowest and the separation of solder will be terminated at the center 1b of the base board 1.

As particularly shown in FIG. 12, the base board 1 has many points 4 provided on the lower side 1c thereof which are required to be soldered. Each of the spaces 6 between the soldering points 4 arranged laterally of the base board is very small due to the increased density of electronic parts mounted on the base board. The smallest spaces may be about 0.2 mm and so many. Therefore if the molten solder 3 comes together to one point when the base board 1 is transported past the molten solder jetting nozzle, the defective soldering phenomena will be caused such as the bridges, icicles, etc., as mentioned hereinbefore. Especially the phenomenon of bridges may be often caused in case of a base board having a higher density of electronic parts mounted at the center part 1b of the base board 1. Namely the adjacent points 4 to be soldered are bridged with the solder.

Further in case of base board 1 having one point 4 provided at the center part 1b thereof which is to be soldered, a phenomenon of icicle, drop or dew may be caused at the point because the molten solder 3 flows together a the point.

Japanese patent application made public 59-997 and Japanese patent application laid open 59-15668 disclose a method for arranging elongated nozzles 2 in a manner as inclined in a horizontal plane with respect to the base board transporting direction A in order to solve the defects and disadvantages of the prior art as mentioned above. Especially these patent applications stress a feature that the base board 1 is inclined so as to be progressively opened with respect to the plane of molten solder jetted up from the nozzles 2 as the base board is transported. It is observed that the prior art is designed to terminate the soldering process at the one end 1a of the base board 1 by simply inclining the nozzles 2 with respect to the base board transporting direction in the horizontal plane. In fact, it is admitted that the feature of the prior art will attain an effect for more or less decreasing the defective soldering results such as the soldering phenomena 5 as shown in FIG. 12. However in view of the fact that the base board 1 is progressively moved up as the base board is transported, the vertical distance between the base board 1 and the nozzles 2 is progressively higher all through the length of the nozzles 2. More precisely a period of time is progressively shorter in which the molten solder 3 contacts the lower side 1c of the base board 1 as the base board is moved past the nozzles. It is therefore apparent that the soldering condition is progressively different all through the length of the nozzles, that is, from one end to the opposite end of the base board all through the width thereof. Such variant soldering condition is far from a desired condition in which the molten solder contacts the base board for 3 seconds to attain a very best soldering effect. Namely such variant soldering condition will cause deflected soldering results.

Depending upon the arrangement of the points 4 to be soldered, it may be possible to prevent the formation of such defective soldering phenomena such as the parts 5 as shown in FIG. 12 by enlarging the inclination of the nozzles with respect to the base board transporting direction. But such enlargement of inclination is limited, and excessive inclination would make it impossible for the molten solder 3 to contact the lower side 1c of the base board 1.

OBJECTS OF THE INVENTION

The invention has been provided to eliminate the defects and disadvantages of the prior art. It is therefore a primary object of the invention to arrange the molten solder jetting nozzles in a manner as inclined with respect the base board transporting direction in a horizontal plane while transporting the base board in a manner as inclined in a vertical plane so that the distance between the lower side of the base board and the top end of the nozzles is constant all through the length of the nozzles as the base board is transported past the nozzles, to thereby terminate the flow of molten solder at one end of the base board so as to prevent the defective soldering phenomena such as bridges, icicles, drops or dews, further to solder all over the base board under a same soldering condition to thereby eliminate the deflected soldering results.

It is another object of the invention to incline the nozzles with a most appropriate angle depending upon the arrangement of the points of base board to be soldered to thereby cope with any type of base board to be soldered.

It is another object of the invention to adjust the inclination of the base board in a vertical plane intersecting the base board transporting direction in association with the inclination adjustment of the nozzles in the horizontal plane in a manner that the distance between the lower side of the base board and the top end of the nozzles is constant all through the length of the nozzles so that a stabilized soldering effect may be attained under a same soldering condition.

It is another object of the invention to be able to easily adjust the inclination angle of the nozzles.

It is another object of the invention to prevent the formation of defective soldering phenomena to thereby eliminate the manual correcting operation and thus higher the soldering operation.

It is still another object of the invention to provide a feed back device for feeding the soldered base board back to the initial position where a new base board is transported to be soldered such that a single worker may sequentially deal with the base boards one after another at one position, to thereby higher the soldering operation efficiency.

SUMMARY OF THE INVENTION

In short, the invention comprises the steps of: transporting a base board to be soldered in a manner that a horizontal position of the base board is progressively moved up in a direction from a base board entrance side to a soldered base board exit side of a base board transporting path; arranging an elongated molten solder jetting nozzle laterally of the base board transporting path in a manner that the nozzle extends inclined with respect to a base board transporting direction in a horizontal plane with a positional variation to be progressively farther from the base board entrance side of the base board transporting path; and inclining the base board in a vertical plane intersecting the base board transporting direction with a positional variation to be progressively lowered in one direction to which the nozzle extends to be progressively farther from the base board entrance side such that a distance between the lower side of the base board and the top end of the nozzle is constant all through a length of the nozzle as the base board is transported past over the nozzle.

Another aspect of the invention comprises: a transporting device for progressively moving up a horizontal position of a base board as the base board is transported to be soldered in a direction from a base board entrance side to a soldered base board exit side of a base board transporting path; an elongated molten solder storing tank having an elongated molten solder jetting nozzle located therein, the solder storing tank being arranged inclined with respect to a base board transporting direction in a horizontal plane; means operated to adjust an inclination of the base board in a vertical plane intersecting the base board transporting direction such that a distance between the lower side of the base board and the top end of the nozzle is constant all through the length of the nozzle as the base is transported past over the nozzle.

Another aspect of the invention comprises: a transporting device for progressively moving up a horizontal position of a base board as the base board is transported to be soldered in a direction from a base board entrance side to a soldered base board exit side of a base board transporting path; an elongated molten solder storing tank having a elongated molten solder jetting nozzle located therein, the solder storing tank being arranged laterally of the base board transporting direction; first adjusting means operated to adjust an inclination of the elongated molten solder storing tank with respect to the base board transporting direction in a horizontal plane to thereby adjust the inclination of the elongated molten solder jetting nozzle accordingly; second adjusting means operated to adjust an inclination of the base board in a vertical plane intersecting the base board transporting direction; the first adjusting means being operatively connected to the second adjusting means such that the adjustment of the base board inclination is made in association with the adjustment of the nozzle inclination while a distance between a lower side of the base board and a top end of the nozzle is kept constant all through the length of the nozzle as the base board is transported past over the nozzle.

Another aspect of the invention comprises an elongated molten solder storing tank having an elongated molten solder jetting nozzle located therein, the elongated molten solder storing tank being arranged with the inclination of about 45° with respect to a base board transporting direction in a horizontal plane.

Another aspect of the invention further comprising a heater for heating the base board to be soldered, the heater being arranged in the base board transporting path between the base board entrance side and the molten solder storing tank.

Another aspect of the invention further comprises a carrier for carrying the base board, the carrier being transported by the transporting device from the base board entrance side to the soldered base board exit side of the base board transporting path.

Another aspect of the invention further comprises feed back means for feeding back the soldered base board from the soldered base board exit side to the base board entrance side of the base board transporting path, the feed back means including a conveyer arranged below the base board transporting path and extending all through the length of the base board transporting path, first lift means arranged at the soldered base board exit side and movable between the soldered base board exit side and one end of the conveyer, and second lift means arranged at the base board entrance side and movable between the base board entrance side and the opposite end of the conveyer, the first lift means transporting the carrier from the soldered base board exit side to the one end of the conveyer, the conveyer transporting the carrier to the second lift means and the second lift means transporting the carrier to the base board entrance side.

BRIEF DESCRIPTION OF THE DRAWINGS

FIGS. 1 through 7 show a first embodiment of the invention, in which:

FIGS. 8 through 9 show a second embodiment of the invention in which:

FIGS. 12 and 13 show the essential parts of a conventional automatic soldering device, in which:

DETAILED DESCRIPTION OF THE INVENTION

The invention will be described in reference to a preferred embodiment as shown in the attached drawings. Now in reference to FIGS. 1 through 4, an automatic soldering apparatus 8 comprises a base board transporting device 9, a solder storing tank 10 and a base board angle adjusting device 11.

Figure 1:
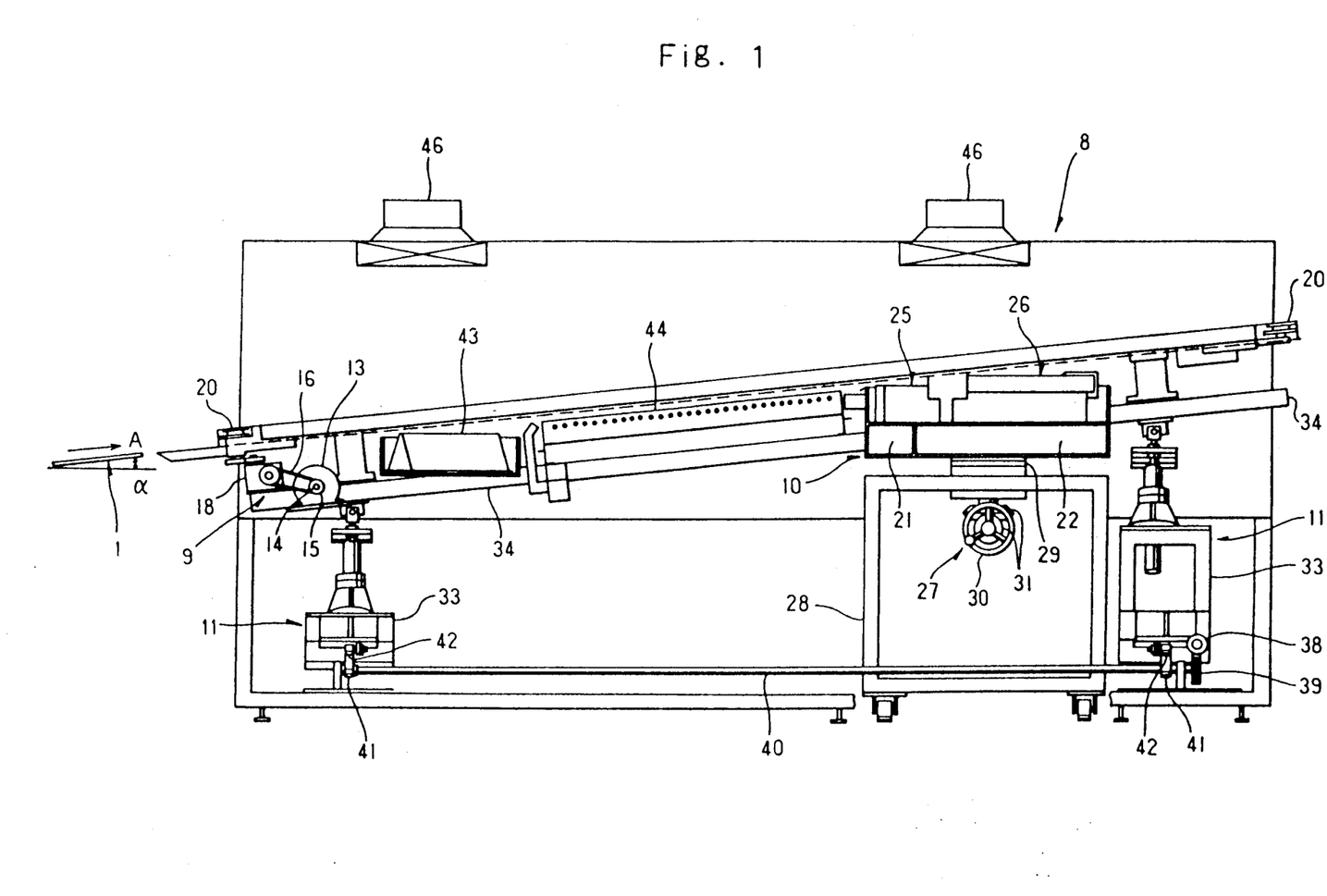
FIG. 1 is a front elevational view of an automatic soldering apparatus according to the invention.
Figure 2:
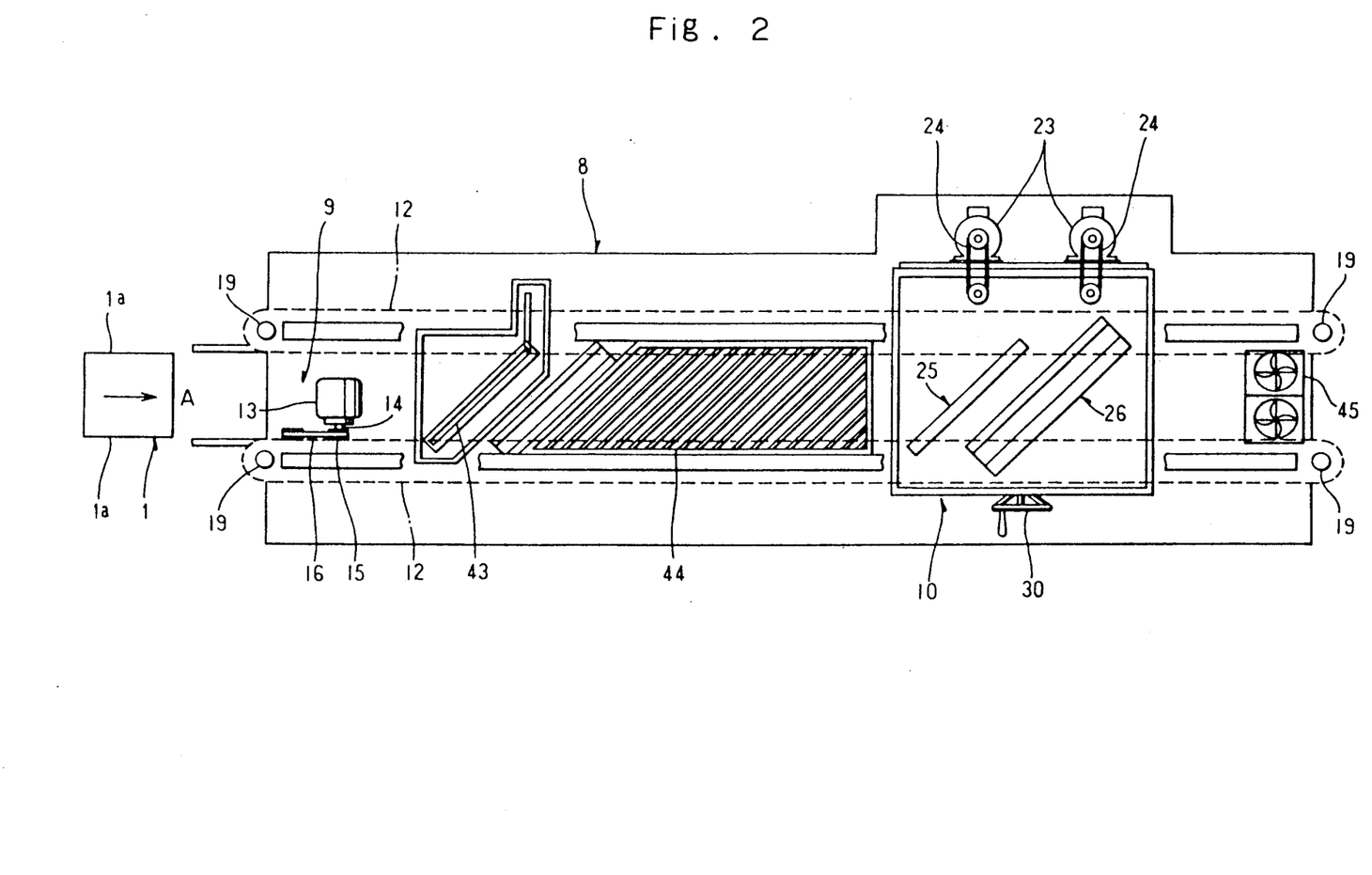
FIG. 2 is a plan view of the automatic soldering apparatus.

Particularly in reference to FIGS. 1 and 2, the base board transporting device 9 holds a base board 1 at the opposite sides 1a thereof and transports the base board in the direction indicated by an arrow A by means of a pair of chain conveyers 12 arranged in parallel with each other. Each of the chain conveyers 12 is connected to an electric motor 13 by way of a belt 16 which engages a pulley 15 secured to a shaft 14 of the motor. The rotation of the motor 13 is transmitted by a transmission mechanism 18 and a shaft 19 to a chain guide wheel 20 which is secured to the shaft 19 and is in engagement with the belt conveyer 12. Thus each of the belt conveyers 12 is moved.

The pair of belt conveyers 12 are arranged with an angle α with respect to a horizontal plane so that the belt conveyers will advance with the base board 1 progressively in the upper direction. The angle α may be adjusted by an handle or the like (not shown).

The solder storing tank 10 is composed of a first solder storing tank 21 and a second solder storing tank 22 each storing heated and molten solder 3 therein which is jetted up from elongated nozzles 25, 26 by means of impellers (not shown) driven by electric motors 23 and belts 24 respectively.

The solder storing tank 10 has a device 27 for changing the angle of the nozzles. Namely a base 28 has a rotational station 29 provided on the top thereof, and the solder storing tank 10 is secured to the top of the rotational station. A handle 30 is provided so as to be manually rotated to thereby rotate bevel gears 31, 31 to transmit the rotation to a vertical shaft 32 of the rotational station 29. Thus the rotational station, that is, the solder storing tank 10 is slowly rotated in a horizontal plane as shown in FIG. 3.

Figure 3:
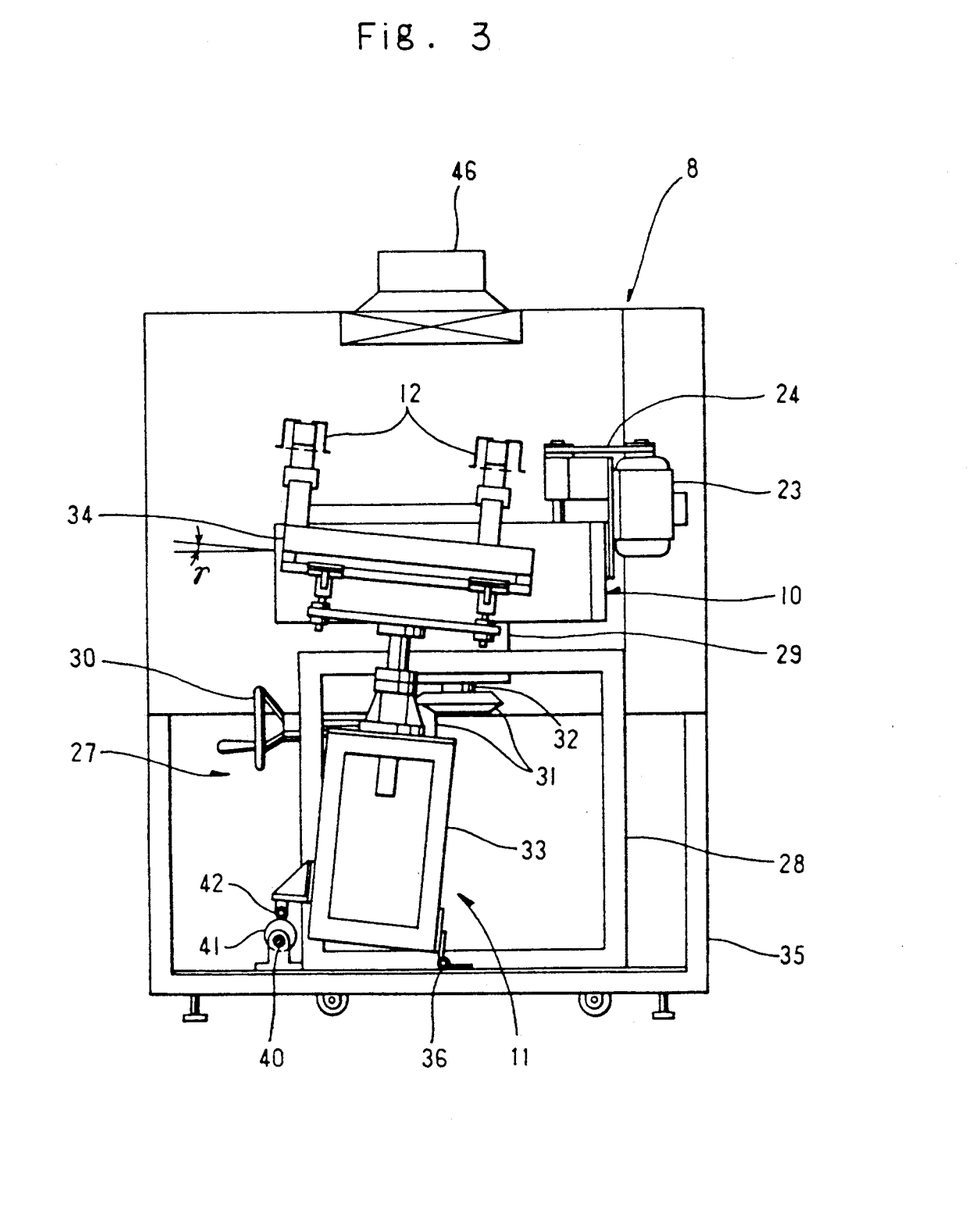
FIG. 3 is a right side elevational view of the apparatus in FIG. 1.
Figure 4:
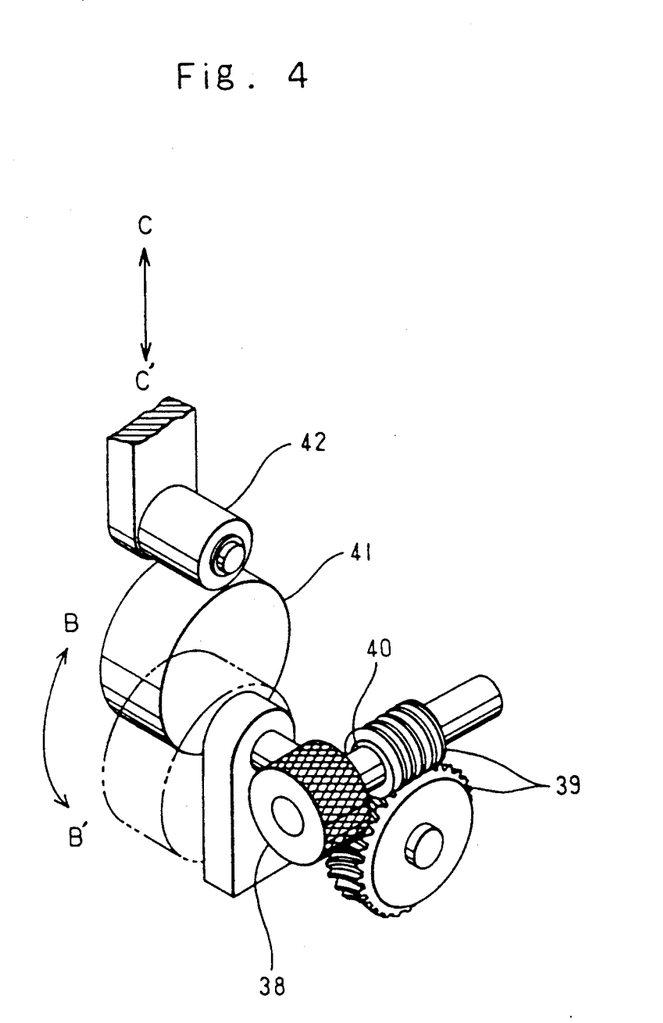
FIG. 4 is an enlarged perspective view of a base board angle adjusting device of the invention.

Further in reference to FIGS. 3 and 4, the base board angle adjusting device 11 is provided to change an inclination angle γ of the pair of belt conveyers 12 with respect to the direction intersecting the base board transporting direction (arrow A) at right angles. In order to attain this aim, a pair of inclination bases 33 are provided. One of the inclination bases 33 is arranged at a base board entrance side and the other is arranged at the base board exit side. The pair of inclination bases 33 carry an elongated support 34 on which the pair of chain conveyers 12 are arranged.

Each of the inclination bases 33 is turnable around a hinge 36 secured to the housing 35 of the automatic soldering apparatus 8. A handle 38 is provided so as to be manually rotated to thereby rotate a shaft 40 through worm gears 39, 39. A cam 41 secured to the shaft 40 is therefore rotated in the direction B or B' to move the inclination base 33 in the direction C or C' through a guide roller 42 which is in engagement with the cam.

The automatic soldering apparatus 8 has a fluxer 43, a preheater 44, base board cooling fans 45 and ventilation ducts 46, which are all generally known, provided at respective predetermined places thereof.

Further according to the automatic soldering method of the invention, the base board 1 is transported in such manner that the base board is moved progressively in the upper direction with a predetermined angle with respect to a horizontal plane while the base board is transported; the molten solder jetting nozzles 25, 26 are arranged in the base board transporting direction with a predetermined inclination in a horizontal plane with respect to the base board transporting direction, the base board being vertically inclined in such manner that the lower side 1c of the base board 1 is progressively lowered toward a direction lateraaly of the base board transporting path where the elongated nozzles 25, 26 are inclined between the two chain conveyers 12 such that the elongated nozzles are progressively farther from the base board entrance of the base board transporting path, so as to obtain a substantially same vertical distance between the lower side 1c of the base board 1 and the elongated nozzles 25, 26 all through the length of the nozzles when the base board passes over the nozzles.

Figure 7:
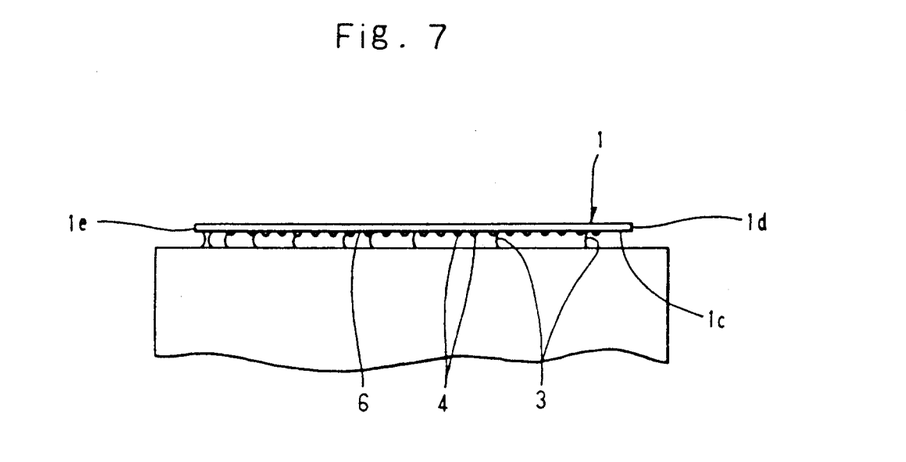
FIG. 7 is a side elevational view of the base board and the nozzles showing the points of the base board to be soldered and the flow of molten solder.

With the structure and method of the invention as described above, the operation is as follows:

In reference to FIGS. 1 and 2, the solder in the solder storing tank 10 is molten when a heater (not shown) is electrically energized and heated. When a power is supplied to the electric motors 23, the motors are driven and the impellers (not shown) are rotated by way of the transmission belts 24 and then the nozzles 25, 26 will jet up the molten solder 3 as shown in FIG. 7.

On the other hand, when the motor 13 is electrically energized, the motor is driven to move the pair of chain conveyers 12. The chain conveyers 12 transports the base board 1 while carrying the opposite sides 1a of the base board 1 in the direction as indicated by the arrow A. The base board 1 is fluxed by the fluxer 43 and preheated by the preheater 44 and is then soldered at the solder storing tank 10.

Figure 5:
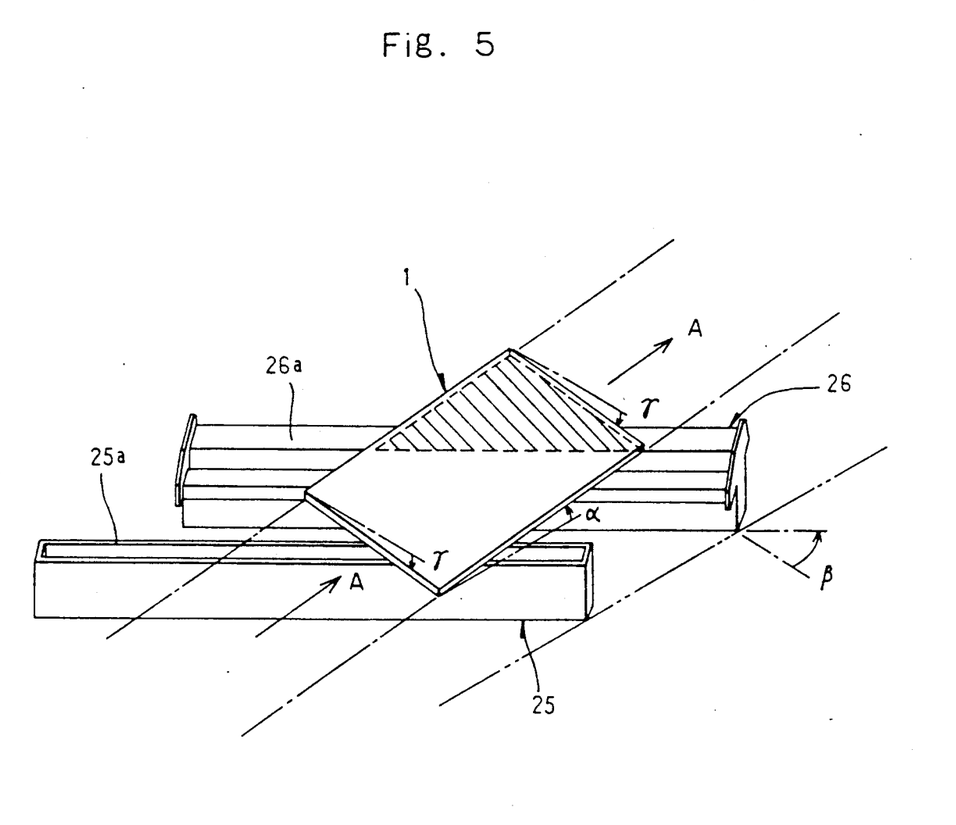
FIG. 5 is a perspective view showing a positional relation between a base board and nozzles of the invention.
Figure 6:
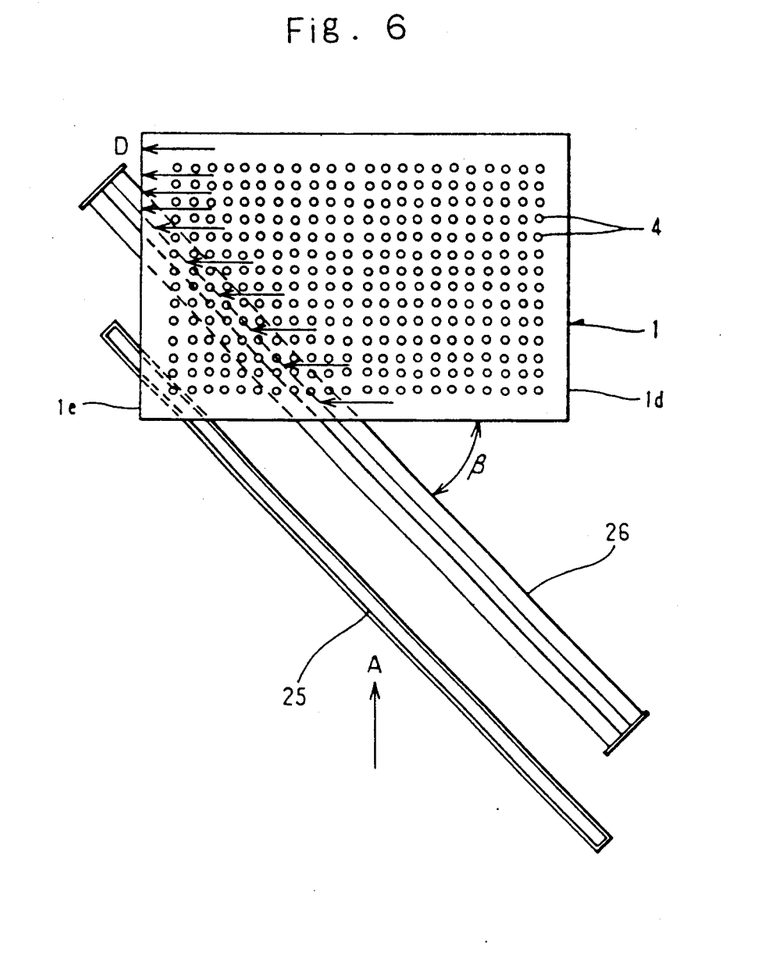
FIG. 6 is a plan view of the base board and the nozzles showing a flow of molten solder with respect to the base board.

Further in reference to FIGS. 5 and 6, if the handle is rotated to incline only the nozzles 25, 26 with an angle $\beta$ in the horizontal plane so as to solder a plurality of points 4 of the base board 1 as required, the soldering condition is progressively varied as the base board 1 is advanced because the lower side 1c of the base board 1 will be progressively higher from the nozzles 25, 26 which are progressively farther from the base board entrance side of the base board transporting path.

It is therefore further required to operate the handle 38 as shown in FIGS. 3 and 4 so as to make the soldering condition constant for attaining a best soldering effect, that is, to rotate the cam 41 to laterally turn the base board angle adjusting device 11 around the hinge 36 to thereby change the hight of the two chain conveyers 12 from each other. More precisely, the base board angle adjusting device 11 is inclined in such means that the lower side 1a of the base board 1 will be inclined with the angle $\beta$ with respect to the horizontal plane so that the base board 1 is progressively lowered laterally of the base board transporting path in the direction to which the elongated nozzles 25, 26 extend with the angle $\beta$ with a positional variation to be progressively farther from the base board entrance side of the base board transporting path, to thereby obtain an constant vertical distance between the lower side 1c of the base board 1 and the upper sides 25a, 26a of the nozzles 25, 26 all through the length of the nozzles when the base board 1 passes over the nozzles. The required inclination angle $\gamma$ of the base board 1 can be determined by the ascending angle $\alpha$ of the base board and the inclination angle $\beta$ of the nozzles with respect to the cross section of the base board transporting path, that is, to satisfy the relation; $\tan \gamma = \tan \alpha . \tan \beta$.

With the soldering condition as mentioned above, a constant soldering time, that is, 3 seconds may be set for contacting the entire soldering side of the base board 1 to the molten solder 3 jetted up from the nozzles so as to attain an ideal and faultless soldering effect without deflections.

Further in reference to FIGS. 6 and 7, since the nozzles 25, 26 are inclined with the angle $\beta$ with respect to the cross section of the base board transporting path, the molten solder 3 flows with respect to the base board in the direction as indicated by arrow D intersecting the base board transporting direction indicated by arrow A with right angles. The soldering operation is therefore initiated from the right side end 1d of the base board 1 and is progressively shifted in the leftward direction and is ended at the left side end 1e of the base board 1. Therefore the molten solder 3 will not converge to one point of the base board 1 and accordingly will not result in the phenomena of so called bridges, icicles, drops or dews which may otherwise be effected.

According to the embodiment, the base board angle adjusting device and the nozzle angle adjusting device are described as the respective independent devices. These devices may however be easily designed to operate in association with each other in accordance with the relation formula $\tan \gamma = \tan \alpha . \tan \beta$. In this case, the change of the inclination angle $\beta$ of the nozzles 25, 26 will cause the relative adjustment of the inclination angle $\gamma$ of the base board 1.

Another embodiment of the invention will be described: Now in reference to FIGS. 8 and 9, an automatic soldering apparatus 111 has a transporting device 112, a feed back device 113, a heater 114 and a solder storing tank 115 provided therewith.

Figure 10:
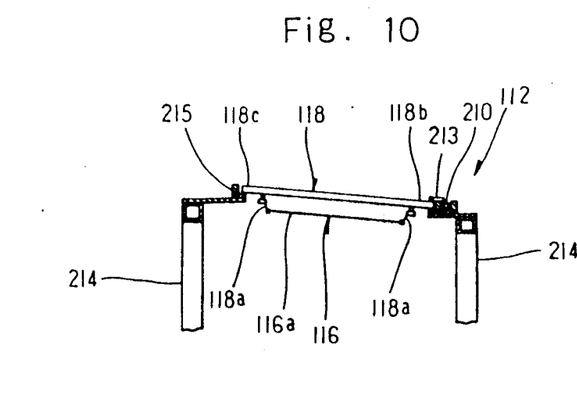
FIG. 10 is a side elevational view shown in vertical section taken along a line III—III in FIG. 1.

Further in reference to FIG. 10, the transporting device 112 includes a carrier 118 having a pair of arms 218a, 218b which are forked and each provided with a pawl 118a for clamping and holding a base board 116. A pair of lift structures 218A, 218B are arranged opposite to each other, one being arranged at one end lengthwise of the apparatus 111 and the other arranged at the opposite end of the apparatus 111. Each of the lift structures 218A, 218B has pulleys 219, 220 having a pair of belts 221 laterally spaced from each other and wound therearound to form a belt conveyer of a width slightly smaller than the width of the carrier 118 so as to carry the carrier 118. The belts 221 are driven by an electric motor 223 by way of a pair of gears 24.

Figure 11:
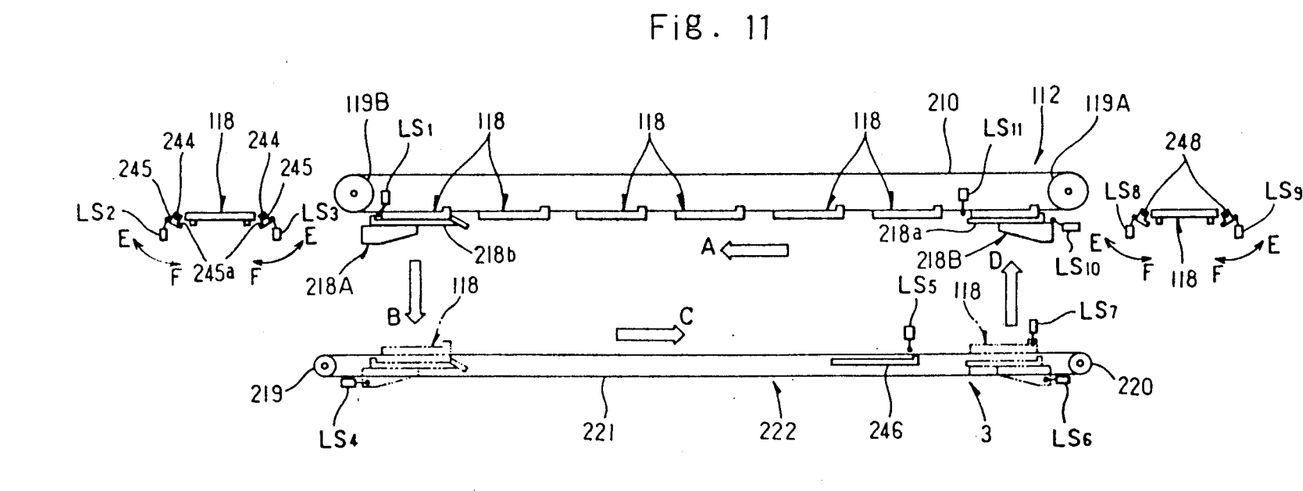
FIG. 11 is a diagramatical representation of a carrier transporting device and a carrier feed back device of the invention.

As particularly shown in FIG. 11, the transporting device 112 and the feed back device 113 have a plurality of sensors $LS_1$-$LS_{11}$ such as microswitches each arranged predetermined places thereof. The sensors will produce electric signals to operate a control device 225 for controlling electric motors 11, 23 and the others as will be described in detail.

A fluxer 226 is arranged below the transporting device 112 so as to flux the required points of the base board 116 which is transported over the fluxer so that the base board may be easily soldered. The transporting device 112 is designed to transport the base board 116 in the direction A progressively ascending with an angle of about 45° with respect to a horizontal plane.

Figure 8:
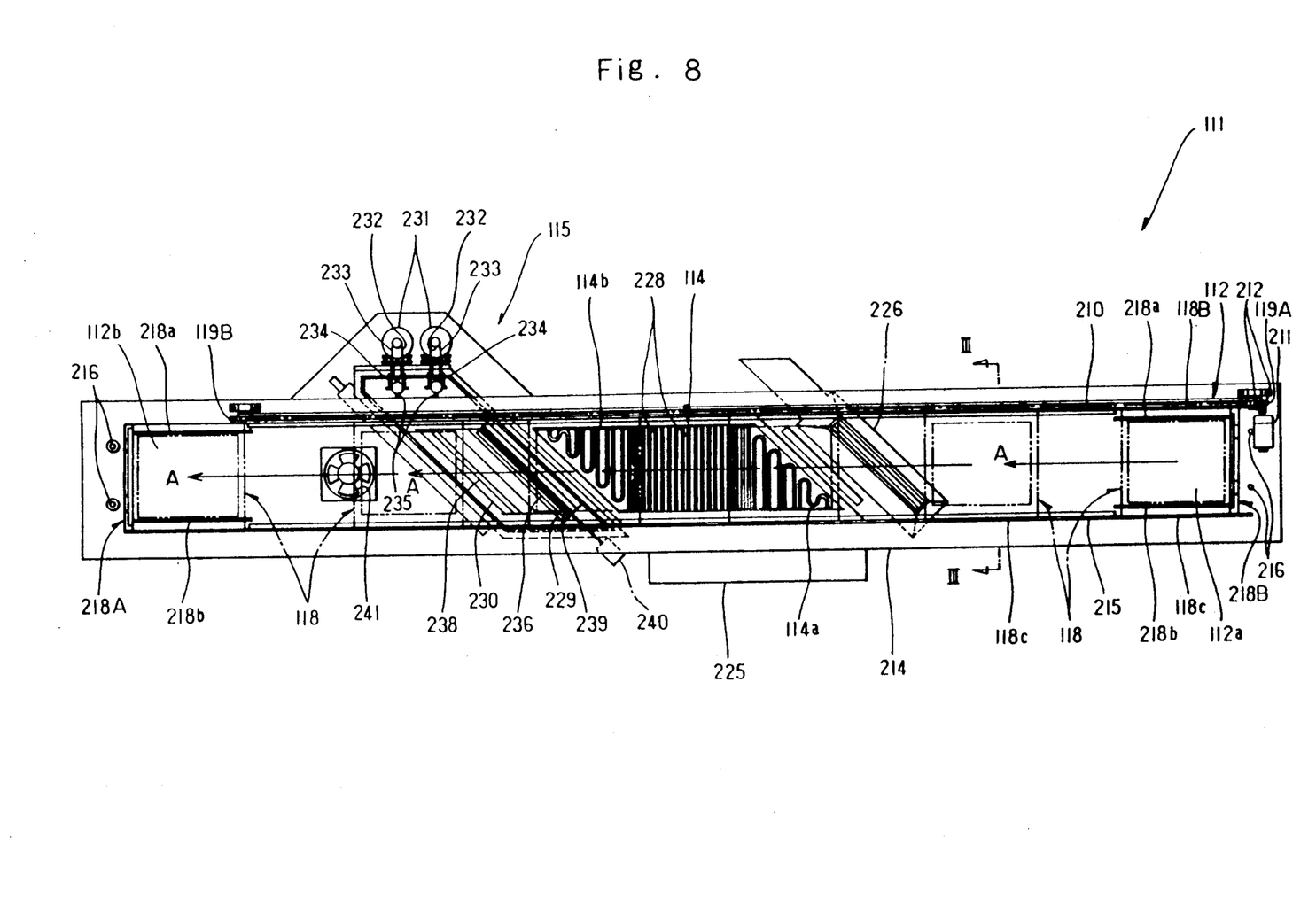
FIG. 8 is a plan view of an automatic soldering apparatus of the invention.

The heater 114 is provided to preheat the base board 116 up to a predetermined temperature, for example, about 110° C. and is composed of a plurality of electric heating elements 228 arranged side by side in the length of about 1 meter in the base board transporting direction. According to the embodiment, the solder storing tank 115 is elongated laterally of the base board transporting direction A and is arranged with inclination in a horizontal plane with respect to the base board transporting direction. In accordance with such arrangement of the solder storing tank 115, the heating elements 228 of the heater 14 are so arranged as shown, that is, the first heating element 114a is laterally shortest and the following heating elements are progressively elongated to a maximum substantially corresponding to the length of the solder storing tank 5 and then the following heating elements are progressively shorter to a minimum at the last part 114b of the heater 114. Thus the heater 114 is designed to uniformly heat the base board 116 as the base board 116 is exposed all through the entire part thereof to the heater in a same period of time as the base board is transported.

Figure 9:
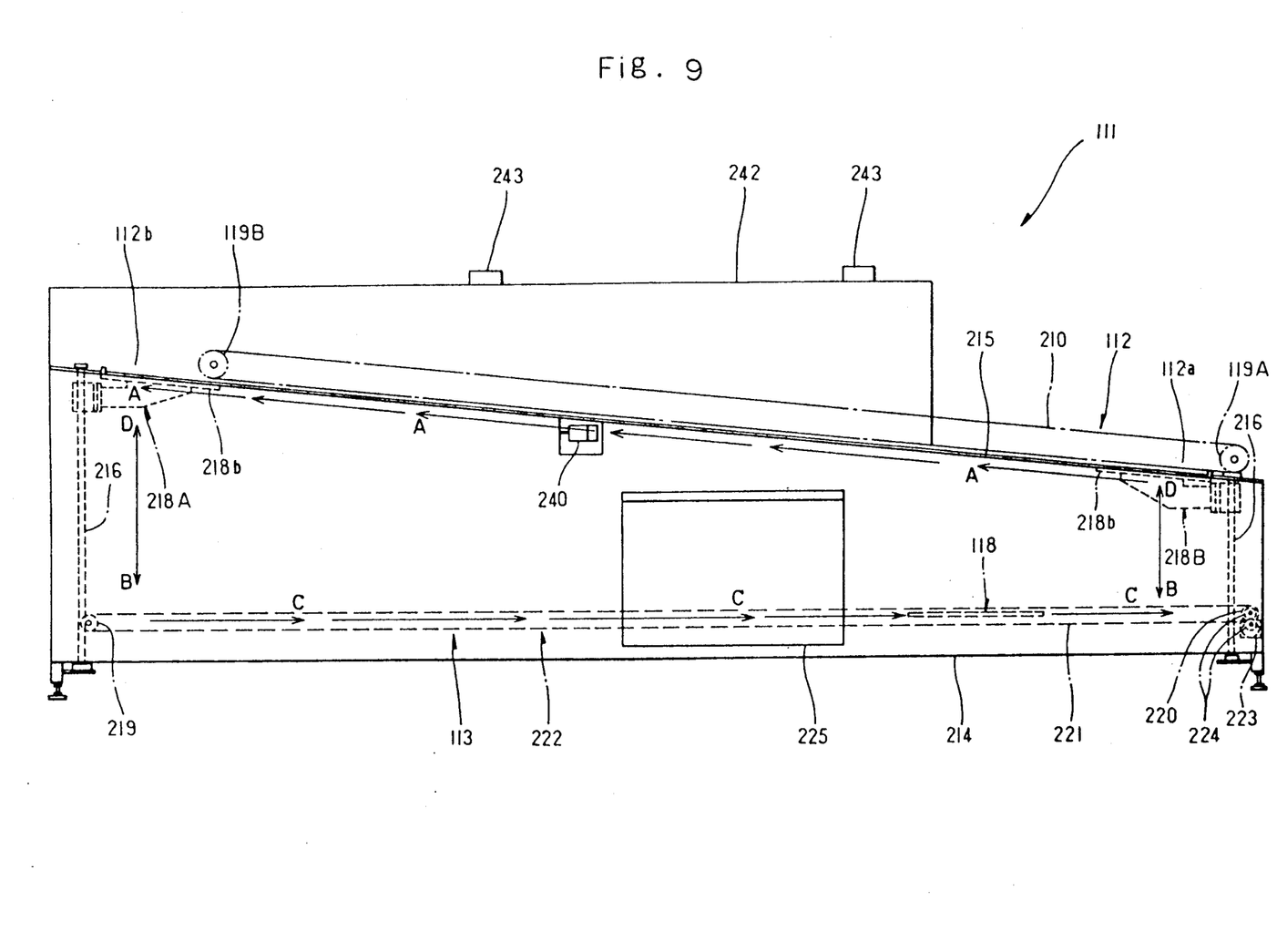
FIG. 9 is a side elevational view of the apparatus.

The solder storing tank 115 is composed of a first tank 229 and a second tank 230 each storing therein a solder (not shown) molten by a heater (not shown). The molten solder is jetted up from nozzled 236, 238 onto a lower side 116a of the transported base board 116 by impellers 35, 35 which are driven by electric motors 231, 231 respectively through pulleys 232, 232 and belts 233, 233. The nozzles 236, 238 are arranged in the first and second solder storing tanks 228, 230 respectively with an inclination of about 45° with respect to the base board transporting direction A. The nozzle 236 in the first solder storing tank 229 has a parallel rotation plate structure 239 provided therein. The parallel rotation plate structure 239 is elongated along the nozzle 236 and is rotated by an electric motor 240 to give pulse-like waves to the molten solder jetted up from the nozzle 236.

Next to the solder storing tank, a fan 241 is provided to cool down the base board 116 which has been heated up to a high temperature by the soldering treatment. The apparatus 111 is provided with a cover 242 which has a plurality of ventilating fans 243, 243 provided thereon for discharging gas and smoke which may be produced during the soldering treatment of the base board 116.

With the structure of the invention as mentioned above, the operation is as follows:

In reference to FIGS. 8 and 9, the first and second solder storing tanks 229, 230 are heated by heaters (not shown) and the solder in the tanks is molten. The molten solder is jetted up from the nozles 236, 238 by impellers 235, 235 rotated by the motors 231, 231 through the belts 233, 233. The molten solder jetted up from the nozzle 236 is pulse-like waved by the parallel rotation plate structure 239 rotated in the nozzle 236 by the motor 240. A guide plate (not shown) is provided adjacent to the nozzle 238 so as to flatten the top of the molten solder wave jetted up from the nozzle 238.

Further in reference to FIGS. 10 and 11, when the motor 11 is energized and rotated, the rotation of the motor is transmitted to a chain 210 through a pair of gears 212, 212 which are in engagement with each other. As the result, the chain 210 is rotated in the clockwise direction in FIG. 11. An engaging piece 213 secured to the chain 210 holds one side 118b of the carrier 118 and the opposite side 118c of the carrier is slidingly placed on a guide rail 215. The carrier 118 is therefore transported in the direction A together with the base board 116 cramped and held by the oppositely arranged pawls 118a of the carrier 118. The base board 116 is fluxed to the required points thereof at the fluxer 226. The fluxer 226 is inclined with respect to the base board transporting direction with the angle of about 45° in the horizontal plane so that the opened fluxing area of the fluxer is substantially 1.4 times of the actual opened fluxing area in effect to efficiently flux the base board 116.

The base board 116 pretreated with the flux is transported over the heater 114 while the base board is heated with the temperature of about 110° C. The heater 114 is inclined at the forward part 114a and at the backward part 114b in parallel with the solder storing tank 115 with the angle of about 45° in the horizontal plane so that the base board 116 is exposed all through the entire part thereof to the heater 114 in a same period of time, and therefore the base board is uniformly heated without deflections.

Further the base board 116 is transported to the first solder storing tank 29 which is jetting up the molten solder having the pulse like waves generated therein. The pulse like waves are effective to exhaust the gas, which is produced from the flux heated by the molten solder, from the lower side 116a of the base board 116 to thereby uniformly wet the base board with the molten solder. Subsequently the base board 116 is soldered most desirably at the second solder storing tank 3 jetting up the molten solder having the flat waves formed at the top thereof which will contact the precededly attached molten solder for 3 seconds at the lower side 116a of the base board 116.

The solder storing tank 115 in inclined about the angle 45° with respect to the base board transporting direction A in the horizontal plane while the base board 116 is transported in the progressively ascending plane with the inclination toward one side, so that the molten solder will flow eventually in the direction of about 90° with respect to the base board transporting direction A. The soldering operation is therefore initiated from the left end of the base board in FIG. 8 and is ended at the right end of the base board 116 as the base board is transported in the direction A. It is accordingly observed that the molten solder will not come together to the width center of the base board 116, and thus the undesired soldering phenomena such as bridges, icicles, drops or dews, etc., will not be produced. The soldered base board 116 is then cooled down by the fan 241 and is further transported to the end 112b of the base board transporting device 112.

Now in reference to FIGS. 9 and 11 showing the feed back device 113, a pair of first carrier holders 245 are arranged on an extention of the chain 210 and the guide rail 215 at the end 112b of the base board transporting device 112. The first carrier holders 245 are turnable on shafts 244, 244 respectively and are normally closed as shown by arrows F, F. When the carrier 118 transported by the transporting device 112 is located on the holding faces 145a, 145a of the carrier holders 245, 245, a micro-switch $LS_1$ is pushed by the carrier 118 and is turned on to give an electric signal. The control device 225 is responsive to the electric signal to turn the carrier holders 245, 245 in the directions E, E through a drive mechanism (not shown) and take the carrier up onto the forked arms 218a, 218b of the lift structure 218A located at an upper station. The carrier holders 245, 245 are turned in the directions E, E respectively to push microswitches $LS_2$, $LS_2$ to turn the same on to thereby move down the lift structure 218A in the direction B. The carrier holders 245, 245 are moved down past the pair of belts 221, 221 therebetween and are stopped at a lower station as shown while leaving the carrier 118 on the belts 221, 221 which are driven at all times in the direction C. Simultaneously the lift structure 218A pushes a microswitch $LS_4$ to turn the same on to thereby move the carrier holders 245, 245 back in a direction F to the upper station for carrying thereon the next carrier.

The carrier 118 transported by the conveyer 222 in the direction C pushes a microswitch $LS_5$ to turn the same on to thereby move up a stop-up member 246 to hold the carrier 118 in an upper position off the conveyer 222 to temporarily stop the transportation of the carrier while moving down the lift structure 218B at the start position of the transporting device 222. The lift structure 218B pushes a microswitch $LS_6$ at the lowest position to turn the same on to thereby move down the stop-up member 246 so that the carrier 118 is placed on the conveyer 222 again which transports the carrier 118 in the direction C and onto the lift structure 218B.

When the carrier 218 is placed on the lift structure 218B, the carrier 218 pushes a microswitch $LS_7$ to turn the same on to thereby move up the lift structure 218B in the direction D on confirmation that a pair of second carrier holders 248, 248 located above are opened in contact with microswitches $LS_8$, $LS_9$ respectively so that the carrier 218B may vertically pass through between the carrier holders 248, 248. The lift structure 218B is moved up to a predetermined position and pushes a microswitch $LS_{10}$ to turn the same on to thereby turn the second carrier holders 248, 248 in the direction F to hold the carrier 118.

Then the machine operator takes off the soldered base board 116 from the carrier 118 and puts a new base board onto the carrier. The chain 210 will then transport the carrier 118 in the direction A, and the carrier 118 will push a microswitch $LS_{11}$ to turn the same on to thereby turn the second carrier holders 248, 248 in the direction E respectively to hold the next base board 116.

Thus the base board 116 carried by the carrier 118 is transported one after another so a to be soldered.

What is claimed is:

1. An automatic soldering method including a provision for progressively moving up a horizontal position of a base board as the base board is transported to be soldered in a direction from a base board entrance side to a soldered base board exit side of a base board transporting path, the method comprising the steps of:

arranging a molten solder jetting nozzle laterally of the base board transporting path in a manner that the nozzle extends inclined with respect to a base board transporting direction in a horizontal plane with a positional variation to be progressively farther from the base board entrance side of the base board transporting path; and transporting the base board while the base board is inclined in a vertical plane intersecting the base board transporting direction with a positional variation to be progressively lowered in one direction to which the nozzle extends to be progressively farther from the base board entrance side such that a distance between a lower side of the base board and the nozzle is constant all through a length of the nozzle as the base board is transported past over the nozzle.

2. As automatic soldering apparatus having a transporting device for progressively moving up a horizontal position of a base board as the base board is transported to be soldered in a direction from a base board entrance side to a soldered base board exit side of a base board transporting path, the apparatus comprising an elongated molten solder storing tank having an elongated molten solder jetting nozzle located therein, the elongated molten solder storing tank being arranged inclined with respect to a base board transporting direction in a horizontal plane;

means operated to adjust an inclination of the base board in a vertical plane intersecting the base board transporting direction such that a distance between a lower side of the base board and a top end of the nozzle is constant all through the length of the nozzle as the base board is transported past over the nozzle.

3. An automatic soldering apparatus having a transporting device for progressively moving up a horizontal position of a base board as the base board is transported to be soldered in a direction from a base board entrance side to a soldered base board exit side of a base board transporting path, the apparatus comprising an elongated molten solder storing tank having an elongated molten solder jetting nozzle located therein, the elongated molten solder storing tank being arranged laterally of the base board transporting direction;

first adjusting means operated to adjust an inclination of the elongated molten solder storing tank in a horizontal plane with respect to the base board transporting direction to thereby adjust the inclination of the elongated molten solder jetting nozzle accordingly;

second adjusting means operated to adjust an inclination of the base board in a vertical plane intersecting the base board transporting direction;

the first adjusting means being operatively connected to the second adjusting means such that the adjustment of the base board inclination is made in association with the adjustment of the nozzle inclination while a distance between a lower side of the base board and a top end of the nozzle is kept constant all through the length of the nozzle as the base board is transported past over the nozzle.

4. The apparatus as defined in claim 2 or 3, wherein the elongated molten solder storing tank is arranged with the inclination of about 45° with respect to the base board transporting direction.

5. The apparatus as defined in claim 2 or 3, further comprising a heater for heating the base board to be soldered, the heater being arranged in the base board transporting path between the base board entrance side and the molten solder storing tank.

6. The apparatus as defined in claim 2 or 3, further comprising a carrier for carrying the base board, the carrier being transported by the transporting device from the base board entrance side to the soldered base board exit side of the base board transporting path.

7. The apparatus as defined in claim 6, further comprising feed back means for feeding back the soldered base board from the soldered base board exit side to the base board entrance side of the base board transporting path, the feed back means including a conveyer arranged below the base board transporting path and extending all through the length of the base board transporting path, first lift means arranged at the soldered base board exit side and movable between the exit side and one end of the conveyer, and second lift means arranged at the base board entrance side and movable between the entrance side and the opposite end of the conveyer, the first lift means transporting the carrier from the exit side to the one end of the conveyer, the conveyer transporting the carrier to the second lift means and the second lift means transporting the carrier to the entrance side.

* * * * *